United States Patent
Van Der Heide

(10) Patent No.: US 7,433,512 B2
(45) Date of Patent: Oct. 7, 2008

(54) METHOD AND APPARATUS FOR FINDING AND CORRECTING SINGLE-PIXEL NOISE DEFECTS IN A TWO-DIMENSIONAL CAMERA PIXEL FIELD AND A CAMERA PROVIDED WITH SUCH AN APPARATUS

(75) Inventor: Auke Van Der Heide, Eindhoven (NL)

(73) Assignee: DALSA Corporation, Waterloo (CA)

( * ) Notice: Subject to any disclaimer, the term of this patent is extended or adjusted under 35 U.S.C. 154(b) by 577 days.

(21) Appl. No.: 10/983,704

(22) Filed: Nov. 9, 2004

(65) Prior Publication Data

US 2006/0115149 A1    Jun. 1, 2006

(51) Int. Cl.
*G06K 9/00* (2006.01)

(52) U.S. Cl. ........................ 382/167; 382/162

(58) Field of Classification Search ................ 382/167, 382/162, 275, 147, 149, 150; 250/208.1; 345/1.1, 1.3; 358/475, 487; 348/272, 297, 348/266, 126; 356/394
See application file for complete search history.

(56) References Cited

U.S. PATENT DOCUMENTS

| | | | |
|---|---|---|---|
| 5,029,226 A | 7/1991 | Klein et al. | 382/275 |
| 6,157,735 A * | 12/2000 | Holub | 382/167 |
| 6,747,697 B1 | 6/2004 | Lin et al. | 348/246 |
| 2002/0164084 A1 | 11/2002 | Baggs | 382/275 |
| 2003/0048368 A1 | 3/2003 | Bosco et al. | 348/272 |
| 2003/0151682 A1 | 8/2003 | Kokubo et al. | 348/241 |

FOREIGN PATENT DOCUMENTS

EP    1045578 A2    10/2000

* cited by examiner

*Primary Examiner*—Anh Hong Do
(74) *Attorney, Agent, or Firm*—Fisher Technology Law PLLC

(57) ABSTRACT

A method for finding and correcting single-pixel noise defects in a two-dimensional camera pixel field assigns to such pixel defect an interpolation multi-pixel environment of the same color as the pixel to be corrected for therefrom deriving an interpolated substitute pixel value.

In particular, the method executes the following steps:
 assigns a multi pixel checking environment of the same color to a possibly defect pixel and checks the possibly defect pixel to the checking environment for finding a correct or an incorrect pixel
 assigns to an incorrect pixel a plurality of predictive multi-pixel environments each oriented in a respective different orientation with respect to the incorrect pixel for therefrom deriving respective viability characterizations for interpolation in the associated orientation
 finds the highest viability characterization and thereby selects an appropriate multi-pixel interpolation environment of the same color for actually interpolating a substitute pixel value.

20 Claims, 5 Drawing Sheets

METHOD AND APPARATUS FOR FINDING AND CORRECTING SINGLE-PIXEL NOISE DEFECTS IN A TWO-DIMENSIONAL CAMERA PIXEL FIELD AND A CAMERA PROVIDED WITH SUCH AN APPARATUS

BACKGROUND OF THE INVENTION

The invention relates to a method for correcting single-pixel noise defects in a two-dimensional camera pixel field through assigning to such pixel defect a multi-pixel environment for therefrom deriving an interpolated substitute pixel value as being recited in the preamble of claim 1. Such cameras pixel fields come with increasingly large numbers of pixels, and have currently exceeded the 1 Mpixel watermark. A discomfort in the use of such cameras are various categories of faulty pixels, and in particular such pixels that are unsteady, although not being limited thereto: sometimes they fail and sometimes they are correct. Furthermore, any correction that is effected should take care to maintain as much from the image information as possible. In particular, the applying of a standard and spatially uniform low pass filter would destroy many a crisp detail from a costly image.

Prior art has recognized that in certain situations the original pixel value should be retained. In particular, the United States Patent Application Publication 2001/0055428 discloses a method for diminishing noise in a megapixel environment, and through assessing a subject pixel and pixel data around it selects either the original pixel, or alternatively, the mean value of subject pixel and environment. However, the present inventor has recognized that even if corrected, the correction should be based on such operations that would not introduce extraneous deviations, and thus the environment that is taken into account for such a relatively simple approach should be screened for acceptability, as it were.

In general, noise reduction algorithms for image applications assume that the signal has a high local correlation. They use some form of spatial averaging to minimize the noise. This will effectively remove so-called speckles, that are image pixels that exhibit a large deviation from surrounding pixels. However, this procedure will also diminish some high frequency components in an image. For a speckle, this will blur the defect out over several pixels depending on the correction kernel size.

Another method uses adaptive noise filtering with a threshold, to determine which pixels in the kernel to use for low-pass filtering. This method preserves high frequency signal components whilst minimizing unwanted noise. However, upon meeting a speckle, the mechanism in question is hardly able to reduce the error intensity, because there are no amplitudes corresponding to the speckle, in particular, when the kernel has a reasonable size such as 5×5 pixels. This approach will then usually retain the original speckle value.

SUMMARY TO THE INVENTION

In consequence, amongst other things, it is an object of the present invention to carefully assess the above environment, so that when the isolated noise or "speckle" pixels has been determined correctly, the various possible interpolations should be carefully checked against each other. Indeed, the inventor hereinafter presents procedures for in various situations straightforwardly attaining improved practices for correcting such speckle noise pixels. In particular, the new pixel value will be based on the analysis of the surrounding pixels inside the kernel.

Now therefore, according to one of its aspects, the invention is characterized according to the characterizing part of claim 1. Various advantageous aspects of the invention are as follows. First, the kernel of pixels considered should preferably be uniform with respect to the various different colors of a multi-color array (three in a Bayer case). Note that the invention could equally be applied to a monochrome pixel field. Second, the processing operations should preferably be linear in the various quantities considered.

The invention also relates to an apparatus being arranged for implementing the method as claimed in claim 1, and to a camera containing such apparatus. Further advantageous aspects of the invention are recited in dependent claims.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures that illustrate.

DETAILED DESCRIPTION OF PREFERRED EMBODIMENTS

Figures 1, 1A:
FIG. 1, a three-color Bayer pattern for use in a digital camera.
FIG. 1a, a multipixel array with an image transition and various possible speckle positions.

FIG. 1 illustrates by way of example a three-color Bayer pattern for use in a digital camera. Nevertheless, similar procedures as to be described for such RGB pattern could apply to other multi-color arrangements such as YUV or even patterns with more than three colors. Now as shown, odd rows have Blue and Green pixels alternating, whereas even rows have Green and Red pixels alternating, the Green pixels collectively constituting a checkerboard pattern. In the discussion hereinafter, the situation considered is relatively far from the edge of the pixel array. Nevertheless, persons skilled in the art would be able to extrapolate the procedures of the invention to situations close to an edge of the image, such as by replacing an absent pixel by a virtual pixel, or by simplifying the algorithms in another manner.

FIG. 1a illustrates a multipixel array with an image transition and various possible speckle positions. Each dot is a pixel. The area in the upper right hand corner bordered by dashed line 100 has a first color that is relatively uniform (hue, luminance, and saturation), or changes only gradually. The remaining area has a second color that is likewise relatively uniform with possibly a gradual change only. Note that the "color" of such area is composed from the pixel values pertaining the various pixels in the Bayer pattern. The following discussion centers on the pixels proper. Now, three possible speckle errors 102, 104, 106 have been shown. The processing kernel is 7×7 pixels. Pixel 102 is far enough from edge 100, so that interpolation of a speckle can safely be done within its kernel of 7×7 pixels. Pixel 104 lies alongside edge 100, so that intuitively, interpolation in a horizontal direction could give good results. Interpolation in vertical or slanted directions could have an effect to locally displace edge 100 somewhat in the upper direction. Pixel 106 lies close to a corner in edge 100. It appears questionable that interpolation of this speckle in any direction would improve the situation. For example, interpolating in a NW-SE direction would tend to make this pixel part of the area of the second color, and thus effectively to rounding the corner of edge 100. However, the procedure to be described hereinafter is robust against many disturbances through speckles and will almost always yield a near-optimum result through using only elementary procedures.

Figure 2:
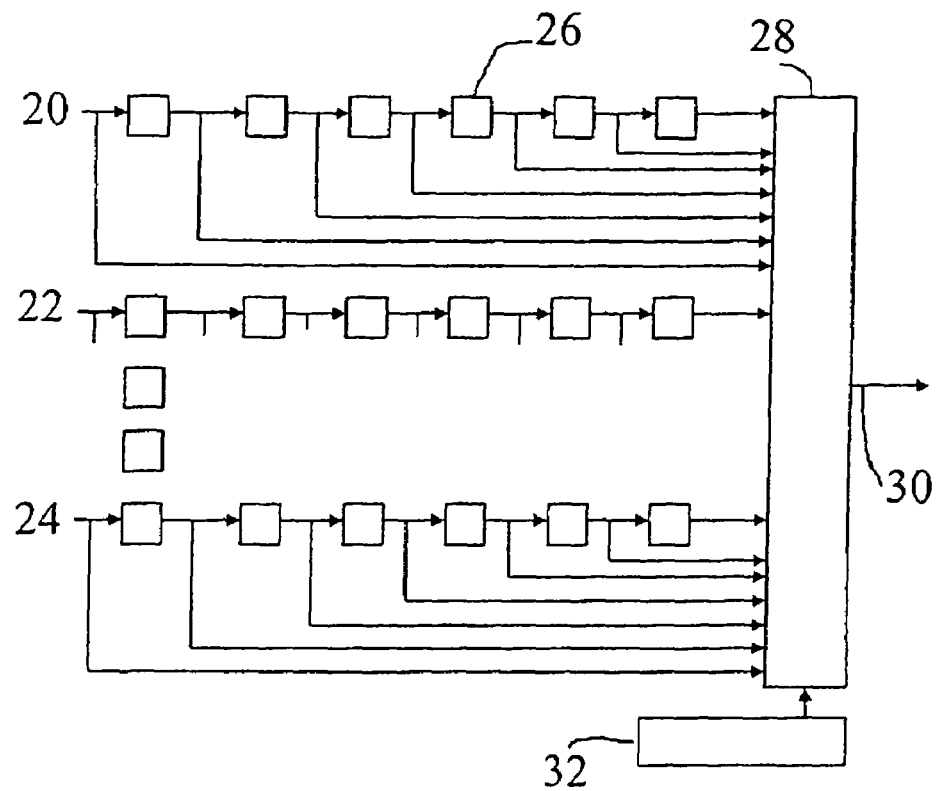
FIG. 2, a device for extracting a pixel sub-set for use as a correction environment.

FIG. 2 illustrates a device for extracting a pixel sub-set for use as a correction environment. Generally, the pixel array is scanned row by row, so that the pixels on one row will appear successively for consideration. Through implementing a row shift register, or alternatively, through simultaneously scanning a plurality of rows in parallel, multiple pixels that lie consecutively in a particular column, appear for being processed simultaneously. As shown, the embodiment has seven parallel input lines of which only 20, 22, 24 have been numbered. Each thereof feeds a string of six flipflops such as flipflop 26. Through signal taps as indicated, a kernel of 7×7 pixels according to the inventor's preference is realized. Nevertheless, both larger and smaller kernel sizes could be appropriate, and also, non-square kernels. Alternatively, the kernel can be implemented in software.

Through providing an appropriate kernel size, averaging filter 28 with output 30 will allow to reconstruct a faulty pixel from data that can pertain to both that pixel itself, and to that pixel's environment. In the arrangement shown, the environment spans a 49 pixel block, but other kernel sizes would be straightforward. The algorithm used could comprise various parameter values that are either derived from the overall pixel data (taken from the current image or from a sequence of corresponding images) or that are selectively prescribed by the original manufacturer or by a user authority or person. Such parameter value(s) would be stored in register(s) 32.

Figure 3:
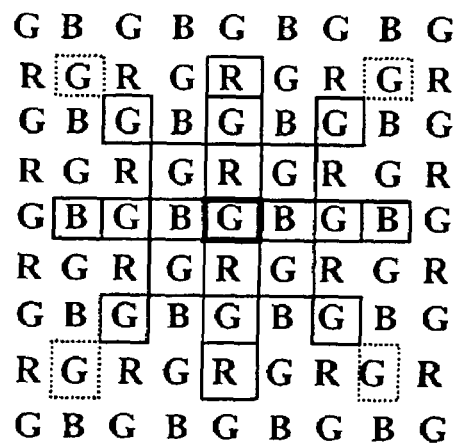
FIG. 3, a specific interpolating environment for a green pixel.

FIG. 3 illustrates a specific interpolating environment for a Green pixel. Now starting from the Green pixel in the center, diagonal lines only consist of Green pixels. In contradistinction, horizontal lines extending from the center have alternating Blue and Green pixels, whereas vertical lines extending from the center have alternating Red and Green pixels. When shifting the center pixel over one diagonal position, each such shift will in the configuration as described interchange the Red pixels for the Blue pixels, and vice versa.

Figures 4, 5:
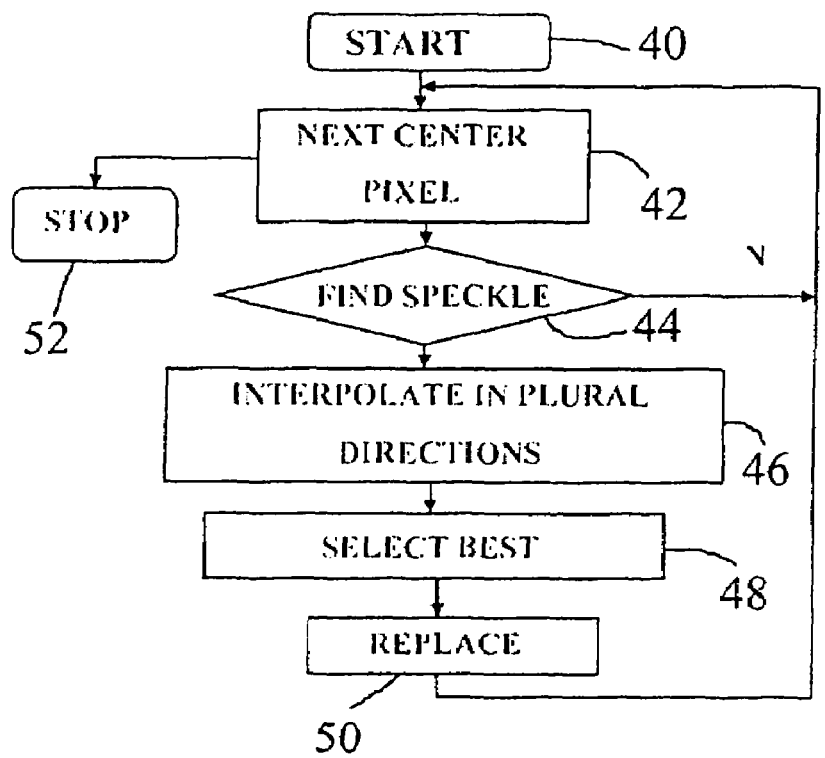
FIG. 4, a specific interpolating environment for a blue pixel.
FIG. 5, a flow chart of the procedure for detecting and correcting of a speckle pixel.

FIG. 4 illustrates a specific interpolating environment for a Blue pixel. Starting from the Blue pixel in the center, diagonal lines consist of alternating Red and Blue pixels. In contradistinction, both horizontal lines and vertical lines extending from the center have alternating Green and Blue pixels. Shifting the center pixel to another Blue pixel position will maintain the configuration as described identically. Shifting the central pixel position to a Red pixel position will exchange all Blue pixel positions to Red pixel positions, and vice versa.

FIG. 5 illustrates a flow chart of a procedure embodiment for detecting and correcting of a speckle pixel. First, in block 40 the procedure commences, and if applicable, the necessary hardware and software facilities are assigned. Next, in block 42, the "center" pixel is selected for checking, and if appropriate, correcting, such as through executing the necessary numbers of shifts in the arrangement of FIG. 1. If the whole array of pixels has been taken into consideration, such will be detected as well, and then the procedure is terminated in block 52.

In block 44, the detection procedure for actually finding a speckle-noise pixel is executed. An elementary procedure is to calculate the Average and the Standard Deviation of the eight surrounding pixels of the same color as the central pixel. For Blue and Red, these will indeed be the closest neighbors of the same color. For Green, this selection will ignore the four adjacent neighbors of the same color. Alternatively, for Green, also the latter four neighbors could be taken into consideration as well. Now the threshold for detecting an incorrect pixel could be represented by a factor times the Standard Deviation: if the center pixel deviates from the average by more than this product, it can be considered an incorrect pixel. The factor can be adjusted by the user. Often, this factor will be somewhat greater than one, such as being in the range 1.3 to 2.0, 1.0 to 5.0, or another selection that would yield a good experimental result. Furthermore, the range could be adaptive, such as depending on the actual gain factor that had been set for the pick-up array, the integration time, and other parameters.

Now, if the actual deviation of the central pixel is greater, the correcting procedure to be described hereinafter will be followed. However, if the deviation is smaller, various other procedures can be followed. A first procedure is to do nothing. A second procedure is to average the center pixel with its closest like-colored neighbors.

Next, in block 46, a plurality of predictive multi-pixel predictive environments are assigned. In the preferred embodiment, each such environment consists of the immediate neighbors in two opposite directions from the center pixel, plus in each such direction, the next two pixels to a total number of six pixels. In the preferred embodiment, such environment is processed according to a uniform operator expression that is independent of actual colors. Numbering the environment plus the center pixel as $P_0, P_1, P_2, P_3, P_4, P_5, P_6$, wherein $P_3$ is the central pixel. Now, from both sides of the central pixel, a respective predictive value $P_{-3}, P_{+3}$ is calculated, according to $$P_{-3} = P_1 + \tfrac{1}{2}(P_2 - P_0)$$

$$P_{+3} = P_5 + \tfrac{1}{2}(P_4 - P_6),$$

while the corrected value for the central pixel is found as $$P_3 = \tfrac{1}{2}(P_{+3} + P_{-3}).$$

The absolute difference between the predictions $P_{+3}$ and $P_{-3}$ indicates the viability, and the viability characterization is highest when the difference is the smallest when compared with the other three directions (horizontal, vertical and two diagonals). Note that another number of directions may be used for interpolating.

The principle of the invention is that the color components of the image have largely corresponding courses: a color transition will usually translate in jumps of all color components. Small values of the color change will indicate better prediction capability. Furthermore, the operators are linear in the various color components. This can be implemented by simple circuitry. Finally, in block 50, the interpolation direction is selected, and the actual interpolation is effected as based on the nearest neighbors of the incorrect pixel with that same color. Thereupon, the procedure shifts to the next pixel.

Various modifications could be effected to the above. First, as is clear from FIG. 3, the "Green prediction" can be based on closer pixels than the "Blue prediction" or the "Red Prediction" (leaving out the pixels in the blocks shown in interrupted lines), or rather based on taking a larger number of pixels, such as six pixels for each Green direction in FIG. 3. However, this leads to non-uniform operators that depend on the color of the central pixel. Nevertheless, various other operators would be feasible in principle. An example would be the following:

$$P_{-3} = a.P_1 + b.P_2 + c.P_0,$$

wherein b>a>c, to give the closest neighbor the highest influence; nevertheless, the earlier operator is preferred by the inventor.

Another approach is to use larger predictive environments overall, such as by taking six pixels everywhere. Still another approach is to expand the predictive environments outside just a single row, column, or diagonal. A still further amendment is to not extrapolate the color values along a predictive group, but to determine a higher differential at the incorrect pixel position. Furthermore, non-linear extrapolation and/or interpolation could be used.

Figure 6A:
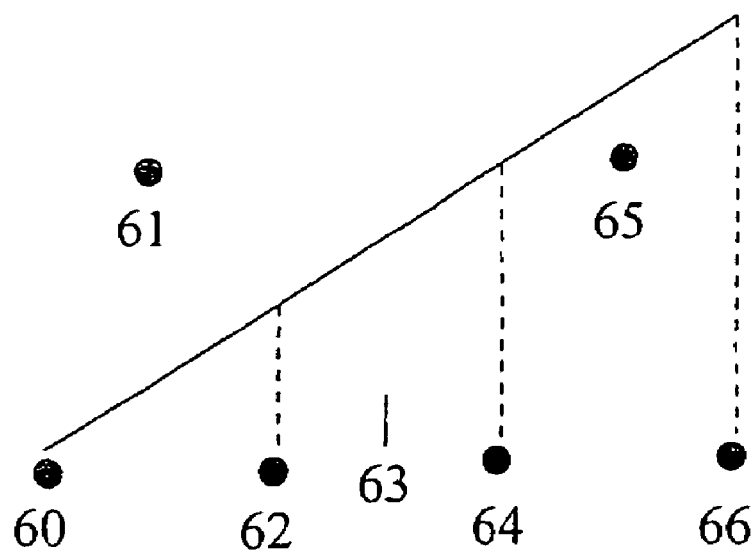
FIGS. 6a-6c, various examples showing the selecting of the "best" environment.

FIG. 6 illustrates various examples that show the selecting of the "best" environment. In FIG. 6a, items 60, 62, 64 and 66 show in the vertical direction the respective color values of four pixels, such as the four Green pixels that are horizontally closest to the center Blue pixel in FIG. 4. The latter has been designated 63. As shown, the four environment pixels exhibit a linear slope of their intensities. This is a case wherein a linear interpolation of the central Blue speckle between its neighboring Blue pixels in the horizontal direction gives a good viability characterization for a good result. Moreover, there is little difference between pixels 61, 65, that represent the other-color pixels of the instant environment. In particular, the second differential of the four Green values at pixel position 63 is near-zero.

Figure 6B:
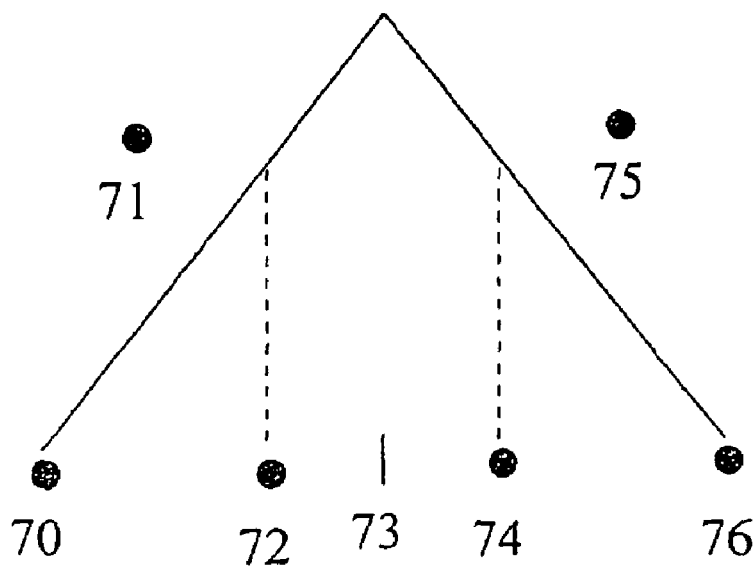

FIG. 6b illustrates a similar case wherein the pixel pair 70, 72 and the pixel pair 74, 76 yield very nearly the same extrapolation value at the central pixel 73. This would therefore also give a high probability for a good result. As in FIG. 6a, at the central pixel position, the second differential of the color values is near-zero. Also here, the other-color pixels 71, 75 have approximately the same color value.

Figure 6C:
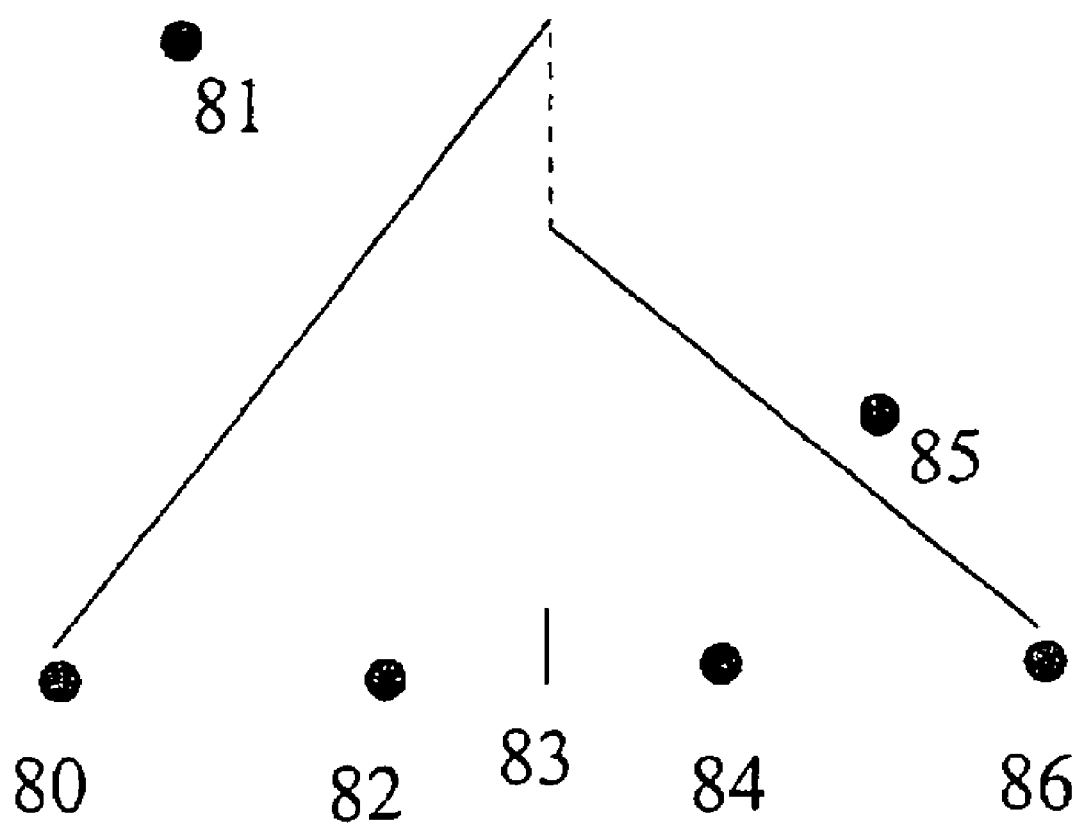

FIG. 6c illustrates a further case. Here, however pixel pair 80, 82 and pixel pair 84, 86 yield markedly different extrapolation values at the central pixel position 83. This would therefore give a lower viability characterization and therefore, smaller probability for a good result. Contrary to FIGS. 6a, 6b, at the central pixel position the second differential of the color values markedly different from zero. The other color pixels 81, 85 are shown to have a quite large intensity difference. Note that by itself, intensities are less correlated between different colors.

Now, if the various environments will yield different results as in FIGS. 6a-c, the choice could be made for FIG. 6a in preference to FIG. 6b, and likewise for FIG. 6b in preference to FIG. 6c. If the differences in extrapolations for two cases are the same, a default direction is selected, such as horizontally, by basing on perceptual arguments. If for all cases the differences are too large (either absolute or relative), the original color value may be retained.

Now, the present invention has hereabove been disclosed with reference to preferred embodiments thereof. Persons skilled in the art will recognize that numerous modifications and changes may be made thereto without exceeding the scope of the appended claims. For example, the invention could be just as well be applied for a higher number of colors, for the same number of colors, but according to a different convention such as YUV, or for a one-color array. In consequence, the embodiments should be considered as being illustrative, and no restriction should be construed from those embodiments, other than as have been recited in the claims.

The invention claimed is:

1. A method comprising:
   determining an average value and a threshold value of pixels within a multi-pixel checking environment defined by pixels of the same color as a pixel under test, the checking environment having been extracted from a two-dimensional pixel array representing an image captured by an imaging sensor;
   declaring the pixel under test to be defective when a value of the pixel under test varies from the average value by more than the determined threshold value;
   calculating a viability measure for each of a plurality of multi-pixel predictive environments defined by the pixel under test;
   selecting the most viable of the predictive environments; and
   interpolating a value for the pixel under test based on the selected most viable predictive environment.

2. A method according to claim 1, wherein:
   the determining of the average value includes calculating an average of values of the pixels that comprise the multi-pixel checking environment; and
   the determining of the threshold value includes calculating a standard deviation of the values of the pixels that comprise the multi-pixel checking environment; and
   the declaring of the pixel under test to be defective declares the pixel as defective when the value of the pixel under test differs from the average value by more than a product of a predetermined factor and the standard deviation.

3. A method according to claim 1, wherein:
   the multi-pixel predictive environments are defined such that each multi-pixel predictive environment is comprised of plural pixels oriented in a line passing through the pixel under test and defining a respective direction; and
   the direction of a first multi-pixel predictive environment is different from the direction of each of the other multi-pixel predictive environments.

4. A method according to claim 1, wherein a color of a first multi-pixel predictive environment is different from a color of each of the other multi-pixel predictive environments.

5. A method according to claim 1, wherein a first multi-pixel predictive environment includes pixels limited to pixels from one of a single row, a single column, and a single diagonal.

6. A method according to claim 1, wherein the calculating of said viability measure includes linearly extrapolating from both ends of a single multi-pixel predictive environment to determine two extrapolated values for the pixel under test.

7. A method according to claim 1, wherein the plurality of multi-pixel predictive environments includes four mutually exclusive multi-pixel predictive environments.

8. An apparatus comprising:
   means for determining an average value and a threshold value of pixels within a multi-pixel checking environment defined by pixels of the same color as a pixel under test;
   means for declaring the pixel under test to be defective when a value of the pixel under test varies from the average value by more than the determined threshold value;
   means for calculating a viability measure for each of a plurality of multi-pixel predictive environments defined by the pixel under test;
   selecting the most viable of the multi-pixel predictive environments; and interpolating a value for the pixel under test based on the selected most viable predictive environment.

9. An apparatus according to claim 8, wherein:

the means for determining the average value includes means for calculating the average of values of the pixels that comprise the multi-pixel checking environment;

the means for determining the threshold value includes means for calculating a standard deviation of the values of the pixels that comprise the multi-pixel checking environment; and the means for declaring of the pixel under test to be defective declares the pixel as defective when the value of the pixel under test differs from the average value by more than a product of a predetermined factor and the standard deviation.

10. An apparatus according to claim 8, wherein:

the multi-pixel predictive environments are defined such that each multi-pixel predictive environment is comprised of plural pixels oriented in a line passing through the pixel under test and defining a respective direction; and the direction of a first multi-pixel predictive environment is different from the direction of each of the other multi-pixel predictive environments.

11. An apparatus according to claim 8, wherein a color of a first multi-pixel predictive environment is different from a color of each of the other multi-pixel predictive environments.

12. An apparatus according to claim 8, wherein the means for calculating said viability measure includes means for linearly extrapolating from both ends of a single multi-pixel predictive environment to determine two extrapolated values for the pixel under test.

13. An apparatus according to claim 8, wherein the plurality of multi-pixel predictive environments includes four mutually exclusive multi-pixel predictive environments.

14. A method comprising:

obtaining an image in the form of a two-dimensional pixel array captured by an imaging sensor;

determining an average value and a threshold value of pixels within a multi-pixel checking environment defined by pixels of the same color as a pixel under test, the checking environment having been extracted from the two-dimensional pixel array;

declaring the pixel under test to be defective when a value of the pixel under test varies from the average value by more than the determined threshold value;

calculating a viability measure for each of a plurality of multi-pixel predictive environments defined by the pixel under test;

selecting the most viable of the predictive environments; and interpolating a value for the pixel under test based on the selected most viable predictive environment.

15. A method according to claim 14, wherein:

the determining of the average value includes calculating an average of values of the pixels that comprise the multi-pixel checking environment; and the determining of the threshold value includes calculating a standard deviation of the values of the pixels that comprise the multi-pixel checking environment; and the declaring of the pixel under test to be defective declares the pixel as defective when the value of the pixel under test differs from the average value by more than a product of a predetermined factor and the standard deviation.

16. A method according to claim 14, wherein:

the multi-pixel predictive environments are defined such that each multi-pixel predictive environment is comprised of plural pixels oriented in a line passing through the pixel under test and defining a respective direction; and the direction of a first multi-pixel predictive environment is different from the direction of each of the other multi-pixel predictive environments.

17. A method according to claim 14, wherein a color of a first multi-pixel predictive environment is different from a color of each of the other multi-pixel predictive environments.

18. A method according to claim 14, wherein a first multi-pixel predictive environment includes pixels limited to pixels from one of a single row, a single column, and a single diagonal.

19. A method according to claim 14, wherein the calculating of said viability measure includes linearly extrapolating from both ends of a single multi-pixel predictive environment to determine two extrapolated values for the pixel under test.

20. A method according to claim 14, wherein the plurality of multi-pixel predictive environments includes four mutually exclusive multi-pixel predictive environments.

* * * * *